(12) United States Patent
Ohata et al.

(10) Patent No.: US 12,337,411 B2
(45) Date of Patent: Jun. 24, 2025

(54) ULTRASONIC WELDING METHOD USING BIASING MEMBERS

(71) Applicants: TOYOTA JIDOSHA KABUSHIKI KAISHA, Toyota (JP); PRIME PLANET ENERGY & SOLUTIONS, INC., Tokyo (JP); PRIMEARTH EV ENERGY CO., LTD., Kosai (JP)

(72) Inventors: Kota Ohata, Toyota (JP); Koshiro Yoneda, Ichinomiya (JP)

(73) Assignees: TOYOTA JIDOSHA KABUSHIKI KAISHA, Toyota (JP); PRIME PLANET ENERGY & SOLUTIONS, INC., Tokyo (JP); TOYOTA BATTERY CO., LTD., Kosai (JP)

( * ) Notice: Subject to any disclaimer, the term of this patent is extended or adjusted under 35 U.S.C. 154(b) by 75 days.

(21) Appl. No.: 18/103,076

(22) Filed: Jan. 30, 2023

(65) Prior Publication Data
US 2023/0241709 A1    Aug. 3, 2023

(30) Foreign Application Priority Data
Feb. 3, 2022    (JP) .................................. 2022-015358

(51) Int. Cl.
| | | |
|---|---|---|
| B23K 20/26 | (2006.01) |
| B23K 20/10 | (2006.01) |
| B23K 37/04 | (2006.01) |
| B23K 101/36 | (2006.01) |
| B23K 103/18 | (2006.01) |
| B29C 65/08 | (2006.01) |

(52) U.S. Cl.
CPC .............. *B23K 20/26* (2013.01); *B23K 20/10* (2013.01); *B23K 37/0435* (2013.01); *B06B 2201/72* (2013.01); *B23K 2101/36* (2018.08); *B23K 2103/18* (2018.08); *B29C 65/08* (2013.01)

(58) Field of Classification Search
CPC ...... B29C 65/08; B06B 2201/72; B23K 20/10
See application file for complete search history.

(56) References Cited

U.S. PATENT DOCUMENTS

| | | | | |
|---|---|---|---|---|
| 4,638,937 A * | 1/1987 | Belanger, Jr. ........... | H01L 21/68 269/21 |
| 4,848,639 A * | 7/1989 | Belanger, Jr. ..... | H01L 21/67144 228/5.5 |
| 5,655,700 A * | 8/1997 | Pham ................... | B23K 20/106 257/E21.511 |
| 6,108,144 A * | 8/2000 | Holderer ................ | B23K 20/10 359/819 |
| 6,877,650 B2 * | 4/2005 | Marsh .................. | B23K 20/004 269/21 |

(Continued)

FOREIGN PATENT DOCUMENTS

| | | | | |
|---|---|---|---|---|
| DE | 202016100110 U1 * | 3/2016 | ........... | B23K 20/106 |
| DE | 102017104615 A1 * | 9/2018 | ............. | B23K 20/10 |

(Continued)

*Primary Examiner* — Erin B Saad
*Assistant Examiner* — Carlos J Gamino
(74) *Attorney, Agent, or Firm* — Dinsmore & Shohl LLP

(57) ABSTRACT

An ultrasonic welding method includes welding workpieces by applying ultrasonic vibration to the workpieces, wherein in the welding, the workpieces are vibrated at an amplitude smaller than an amplitude of the ultrasonic vibration.

7 Claims, 1 Drawing Sheet

(56) References Cited

U.S. PATENT DOCUMENTS

| | | | | |
|---|---|---|---|---|
| 6,880,742 | B2 * | 4/2005 | Voss | B29C 66/0062 |
| | | | | 228/5.1 |
| 8,720,767 | B2 * | 5/2014 | Byars | H01L 24/78 |
| | | | | 228/904 |
| 10,147,700 | B2 * | 12/2018 | Heng | H01L 24/78 |
| 10,766,098 | B2 * | 9/2020 | Scharkowski | B23K 20/10 |
| 11,389,893 | B2 * | 7/2022 | Brunner | H01R 43/0263 |
| 2002/0060724 | A1 * | 5/2002 | Le | B41J 2/1629 |
| | | | | 347/71 |
| 2019/0001430 | A1 * | 1/2019 | Malchow | B29C 66/1122 |
| 2019/0224776 | A1 | 7/2019 | Hirose et al. | |
| 2020/0009681 | A1 | 1/2020 | Scharkowski | |
| 2023/0045159 | A1 * | 2/2023 | Sakurai | B23K 20/2333 |

FOREIGN PATENT DOCUMENTS

| | | | | |
|---|---|---|---|---|
| EP | 64737 A * | 11/1982 | | B23K 20/106 |
| JP | H11-047956 A | 2/1999 | | |
| JP | 2000-202641 A | 7/2000 | | |
| JP | 2001058634 A * | 3/2001 | | B29C 65/08 |
| JP | 2001062943 A * | 3/2001 | | B29C 65/08 |
| JP | 2005-199301 A | 7/2005 | | |
| JP | 2016-203251 A | 12/2016 | | |
| JP | 2018-015961 A | 2/2018 | | |
| JP | 2019-126822 A | 8/2019 | | |
| KR | 20170060380 A * | 6/2017 | | |
| WO | WO-2021089154 A1 * | 5/2021 | | B23K 20/10 |

\* cited by examiner

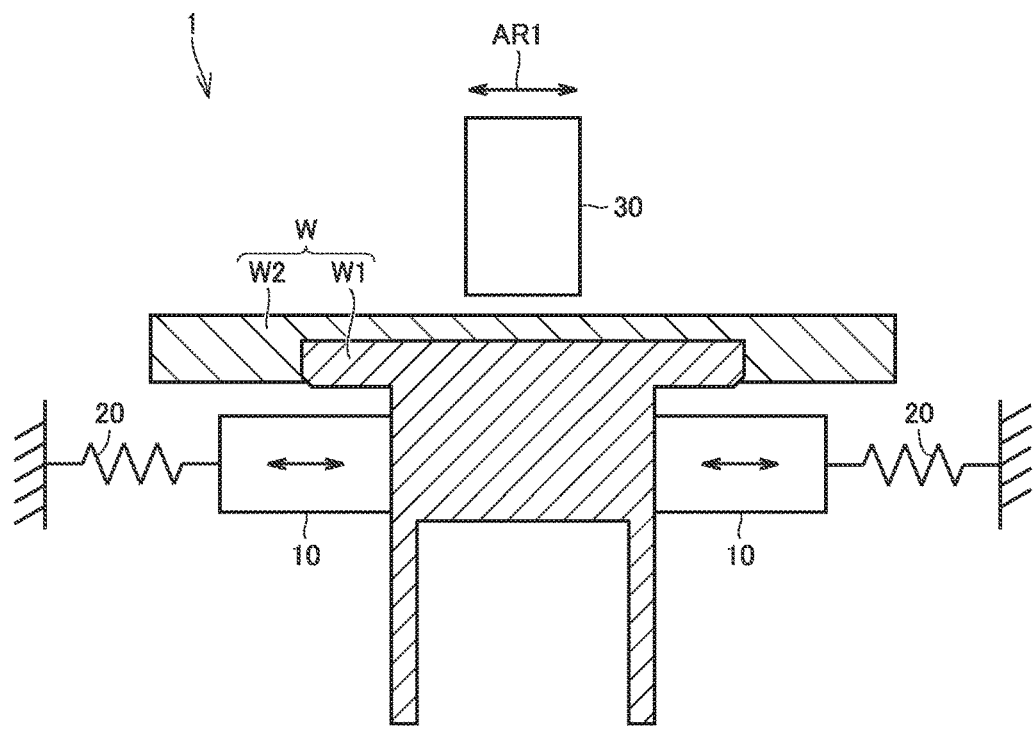

ULTRASONIC WELDING METHOD USING BIASING MEMBERS

CROSS-REFERENCE TO RELATED APPLICATIONS

This nonprovisional application is based on Japanese Patent Application No. 2022-015358 filed on Feb. 3, 2022 with the Japan Patent Office, the entire contents of which are hereby incorporated by reference.

BACKGROUND

Field

The present disclosure relates to an ultrasonic welding method and an ultrasonic welding apparatus.

Description of the Background Art

For example, Japanese Patent Laying-Open No. 2019-126822 discloses a method of welding a plurality of metal foils, which are placed on a current collecting plate, to the current collecting plate by applying ultrasonic vibration to the plurality of metal foils.

SUMMARY

When welding metal plates together by the ultrasonic welding method, if pressure applying force by a horn or an amplitude of ultrasonic vibration applied from the horn to the metal plates is increased in order to attain large frictional thermal energy to cause diffusion welding, it is concerned that the metal plates may be broken.

It is an object of the present disclosure to provide an ultrasonic welding method and an ultrasonic welding apparatus, by each of which thermal energy generated at a welding interface can be increased while suppressing breakage of a workpiece.

An ultrasonic welding method according to an aspect of the present disclosure includes welding workpieces by applying ultrasonic vibration to the workpieces, wherein in the welding, the workpieces are vibrated at an amplitude smaller than an amplitude of the ultrasonic vibration.

Further, an ultrasonic welding apparatus according to an aspect of the present disclosure includes: a holding member that holds a workpiece; a biasing member that biases the holding member toward the workpiece; and a horn that applies ultrasonic vibration to the workpiece held by the holding member, wherein the biasing member biases the holding member toward the workpiece so as to vibrate the workpiece at an amplitude smaller than an amplitude of the ultrasonic vibration.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 1 is a diagram schematically showing an ultrasonic welding apparatus according to one embodiment of the present disclosure.

DESCRIPTION OF THE EMBODIMENTS

Embodiments of the present disclosure will be described with reference to figures. It should be noted that in the FIGURES referenced below, the same or corresponding members are denoted by the same reference characters.

FIG. 1 is a diagram schematically showing an ultrasonic welding apparatus according to one embodiment of the present disclosure. In some embodiments, this ultrasonic welding apparatus 1 is suitable to weld different types of metals that both form a diffusion layer, and is used to welding an external terminal of a power storage cell and a bus bar, for example.

Ultrasonic welding apparatus 1 includes a holding member 10, a biasing member 20, and a horn 30.

Holding member 10 holds a workpiece W. Workpieces W have a first member W1 and a second member W2 disposed on first member W1. In the present embodiment, an external terminal of a power storage cell is used as first member W1, and a bus bar is used as second member W2. The external terminal is composed of copper, and the bus bar is composed of aluminum. It should be noted that first member W1 and second member W2 are not limited to the external terminal and the bus bar as long as they are different types of metals that both form a diffusion layer.

Holding member 10 holds first member W1. Specifically, holding member 10 sandwiches first member W1 from both sides in a vibration direction (leftward-rightward direction in FIG. 1) of horn 30. It should be noted that holding member 10 may sandwich first member W1 from both sides in a direction orthogonal to the vibration direction of horn 30 (direction orthogonal to the plane of sheet in FIG. 1).

Horn 30 applies ultrasonic vibration to workpiece W held by holding member 10. Horn 30 vibrates along a surface of second member W2 as indicated by an arrow AR1 in FIG. 1.

Biasing member 20 biases holding member 10 toward workpiece W so as to vibrate workpiece W at an amplitude smaller than the amplitude of the ultrasonic vibration and at the same frequency as the frequency of the ultrasonic vibration. Biasing member 20 biases holding member 10 toward workpiece W so as to vibrate workpiece W in a direction parallel to the vibration direction of the ultrasonic vibration (leftward-rightward direction in FIG. 1).

Biasing force by biasing member 20 is set such that a contact surface pressure applied from holding member 10 to workpiece W is 10 N/mm$^2$ or more and the amplitude of workpiece W is 60% or less of the amplitude of the ultrasonic vibration. In some embodiments, the amplitude of workpiece W is 10 μm or less.

Ultrasonic welding apparatus 1 in this embodiment can perform an ultrasonic welding method including a welding step. The welding step is a step of welding workpieces W by applying ultrasonic vibration to workpieces W. In this welding step, workpieces W are vibrated at an amplitude smaller than the amplitude of the ultrasonic vibration. In this welding step, workpieces W are vibrated in the direction parallel to the vibration direction of the ultrasonic vibration. In some embodiments, the welding step, workpieces W are vibrated at an amplitude of 60% or less of the amplitude of the ultrasonic vibration.

In the ultrasonic welding method described above, W1 is defined to represent power during the vibration of horn 30, t1 is defined to represent a welding time, and a1 is defined to represent efficiency of conversion from the ultrasonic vibration to thermal energy at an interface between the workpieces. On the other hand, in the case where workpieces W are fixed as in the conventional art, W2 is defined to represent power during vibration of horn 30, t2 is defined to represent a welding time, and a2 is defined to represent efficiency of conversion from the ultrasonic vibration to thermal energy at the interface between the workpieces.

In the present embodiment, horn 30 is vibrated more readily as compared with the case where workpieces W are fixed and therefore W1<W2 is satisfied, the efficiency of conversion from the ultrasonic vibration to the thermal energy at the interface between the workpieces is decreased and therefore a1<a2 is satisfied, and the welding time becomes long and therefore t1>t2 is satisfied.

It should be noted that since a relation of W1·t1·a1>W2·t2·a2 is established, a total amount of the thermal energy generated at the welding interface between workpieces W is larger in the present embodiment. In other words, as compared with the case where the workpieces W are fixed, the efficiency of conversion from the ultrasonic vibration to the thermal energy at the interface between the workpieces is decreased; however, since the time required to weld workpieces W becomes long, the thermal energy generated at the welding interface between workpieces W becomes larger than that in the case where workpieces W are fixed.

Therefore, in the present embodiment, the thermal energy generated at the welding interface between workpieces W can be increased while suppressing breakage of workpieces W. Therefore, productivity is improved.

The illustrative embodiments described above are specific examples of the following configurations.

An ultrasonic welding method according to the above-described embodiment includes welding workpieces by applying ultrasonic vibration to the workpieces, wherein in the welding, the workpieces are vibrated at an amplitude smaller than an amplitude of the ultrasonic vibration.

In this ultrasonic welding method, as compared with the case where the workpieces are fixed, the efficiency of conversion from the ultrasonic vibration to the thermal energy at the interface between the workpieces is decreased; however, since the time required to weld the workpieces becomes long, the thermal energy generated at the welding interface between the workpieces becomes larger than that in the case where the workpiece is fixed. Therefore, the thermal energy generated at the welding interface between the workpieces is increased while suppressing breakage of the workpieces.

Further, in the welding, the workpieces may be vibrated at an amplitude of 60% or less of the amplitude of the ultrasonic vibration.

In this way, the above-described effect can be obtained more securely.

In some embodiments, in the welding, the workpieces are vibrated in a direction parallel to a vibration direction of the ultrasonic vibration.

Further, an ultrasonic welding apparatus according to the above-described embodiment includes: a holding member that holds a workpiece; a biasing member that biases the holding member toward the workpiece; and a horn that applies ultrasonic vibration to the workpiece held by the holding member, wherein the biasing member biases the holding member toward the workpiece so as to vibrate the workpiece at an amplitude smaller than an amplitude of the ultrasonic vibration.

In this ultrasonic welding apparatus, the thermal energy generated at the welding interface of the workpiece can be increased while suppressing breakage of the workpiece.

In some embodiments, the biasing member biases the holding member toward the workpiece so as to vibrate the workpiece at the same frequency as a frequency of the ultrasonic vibration.

Further, biasing force by the biasing member may be set such that a contact surface pressure applied from the holding member to the workpiece is 10 N/mm² or more and an amplitude of the workpiece is 60% or less of an amplitude of the ultrasonic vibration.

In this way, each of a negative terminal plate of a power storage cell and a bus bar can be used as the workpiece.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An ultrasonic welding method comprising welding a bus bar to an external terminal of a power storage cell by applying ultrasonic vibration to the external terminal and the bus bar, wherein
   in the welding, the external terminal is sandwiched by a first holding member and a second holding member from opposite sides in a vibration direction of the ultrasonic vibration applied to the external terminal and the bus bar, the first holding member biased toward the external terminal in a first direction by a first biasing member, and the second holding member biased toward the external terminal in a second direction opposite the first direction by a second biasing member,
   in the welding, the first biasing member and the second biasing member bias the first holding member and the second holding member toward the external terminal such that the external terminal and the bus bar are vibrated at an amplitude smaller than an amplitude of the ultrasonic vibration,
   in the welding, the first biasing member and the second biasing member bias the first holding member and the second holding member toward the external terminal such that the external terminal and the bus bar are vibrated with a contact surface pressure that is 10 N/mm 2 or more applied from the first holding member and the second holding member to the external terminal and with an amplitude of 60% or less of the amplitude of the ultrasonic vibration.

2. The ultrasonic welding method according to claim 1, wherein in the welding, the external terminal and the bus bar are vibrated in a direction parallel to a vibration direction of the ultrasonic vibration.

3. The ultrasonic welding method according to claim 1, wherein in the welding, the amplitude of the external terminal and the bus bar is 10 μm or less.

4. The ultrasonic welding method according to claim 1, wherein in the welding, the first holding member and the second holding member also sandwich the external terminal from both sides in a direction orthogonal to the vibration direction.

5. The ultrasonic welding method according to claim 1, wherein the first holding member is independently movable relative to the second holding member.

6. The ultrasonic welding method according to claim 1, wherein in the welding, the first holding member and the second holding member directly contact the external terminal.

7. The ultrasonic welding method according to claim 1, wherein in the welding, the first holding member, the second holding member, the first biasing member, the second biasing member, and the external terminal are aligned along an axis.

* * * * *